United States Patent [19]

Cofer

[11] Patent Number: 4,552,376
[45] Date of Patent: Nov. 12, 1985

[54] TRAILER HITCH LAMP GUIDE

[76] Inventor: Archie Cofer, P.O. Box 75, Waureka, Okla. 73573

[21] Appl. No.: 552,523

[22] Filed: Nov. 16, 1983

[51] Int. Cl.[4] .............................................. B60Q 1/00
[52] U.S. Cl. ..................................... 280/477; 33/264; 33/286
[58] Field of Search .................. 280/477; 33/264, 286; 362/61, 80, 82

[56] References Cited

U.S. PATENT DOCUMENTS

| 2,984,011 | 5/1961 | Hamilton | 280/477 X |
| 3,484,136 | 12/1969 | Colson | 33/286 X |
| 3,720,000 | 3/1973 | Schlegel | 33/264 |
| 3,901,536 | 8/1975 | Black | 280/477 |
| 4,065,147 | 12/1977 | Ross | 280/477 |

FOREIGN PATENT DOCUMENTS 549769  5/1932  Fed. Rep. of Germany ........ 33/264

Primary Examiner—Joseph F. Peters, Jr.
Assistant Examiner—Charles R. Watts
Attorney, Agent, or Firm—Robert K. Rhea

[57] ABSTRACT

A trailer hitch guide for assisting the operator of a towing vehicle in positioning the trailer hitch components in cooperative coupling relation includes a translucent light beam receiving target member mounted on the towing vehicle for interrupting light beams from a lamp mounted on the trailer tongue. The position of focused lamp rays on a preselected portion of the target member indicates to the operator when the hitch components are in cooperative coupling position.

5 Claims, 2 Drawing Figures

TRAILER HITCH LAMP GUIDE

BACKGROUND OF THE INVENTION

1. Field of the invention.

The present invention relates to trailer hitches and more particularly to a guiding device enabling the operator of a towing vehicle to accurately back toward a trailer hitch connecting position.

Positioning the trailer hitch ball on a towing vehicle in position to be received by a trailer hitch socket formed on the forward end of a travel trailer tongue, or the like, is a relatively difficult procedure for a motorist even with the assistance of a helper giving verbal directions to the operator of the towing vehicle. One of the problems is accurate depth perception on the part of the helper or the operator. When a helper is not available, problems involving a successful trailer hitch connection increase appreciably resulting in an undue amount of towing vehicle back and forth maneuvering as well as the operator leaving his driver position to observe the relative position between the hitch components.

2. Description of the prior art.

A number of alignment devices have been proposed for assisting the operator of a towing vehicle, such as where two or more members supported by the trailer hitch components must be maintained in alignment with the towing vehicle operator's eye while backing the towing vehicle toward the trailer hitch. Such alignment devices depend on the operator maintaining his head and eye position fixed during the entire towing vehicle backup sequence which is unrealistic. Movement of his head toward either side interrupts the alignment which at best usually results in inaccurate alignment of hitch components.

The most pertinent patent is believed to be U.S. Pat. No. 3,720,000 which discloses a guide ball mounted in vertical spaced relation above the trailer hitch ball and a lamp positioned vertically above a trailer hitch socket so that when the guide ball contacts the lamp support a switch is closed to illuminate the lamp indicating the trailer hitch ball is disposed under the hitch socket. This device requires the operator to align the guide ball with a target area on the lamp support while backing the towing vehicle in which lateral misalignment of the hitch components may occur as a result of the operator not maintaining visual alignment of his eye with the ball and target.

This invention is distinctive over related prior art guide devices by forming a vehicle operator trailer hitch guide utilizing a lamp which focuses on a target equally operable during daylight or darkness hours.

SUMMARY OF THE INVENTION

A lamp is supported above a trailer tongue rearwardly of a trailer hitch socket by a bracket vertically adjustably secured to the housing of a trailer tongue jack. A lamp ray target is mounted in upstanding relation on the rearward end portion of a towing vehicle in longitudinal alignment with respect to a trailer hitch ball mounted on the rearward end of the towing vehicle to be received by the trailer hitch socket. The lamp ray target is preferably formed from colored translucent material having a defined target area intermediate its ends for visually indicating when the focused rays of the lamp are centered thereon which also serves as a signal that the trailer hitch ball and its socket are in vertically spaced superposed relation and may be coupled.

The principal objects of this invention are to provide a trailer hitch connecting guide which may be utilized by the operator of a towing vehicle without the assistance of a helper, which visually indicates whether or not the trailer hitch components are in proper alignment prior to the towing vehicle making contact with the towed vehicle, which visually indicates the direction of misalignment, if any, visually indicates a selected distance between the vehicles prior to the desired coupling position and indicates to the operator when the hitch components are in superposed vertically spaced relation.

DESCRIPTION OF THE PREFERRED EMBODIMENT

Figures 1, 2:
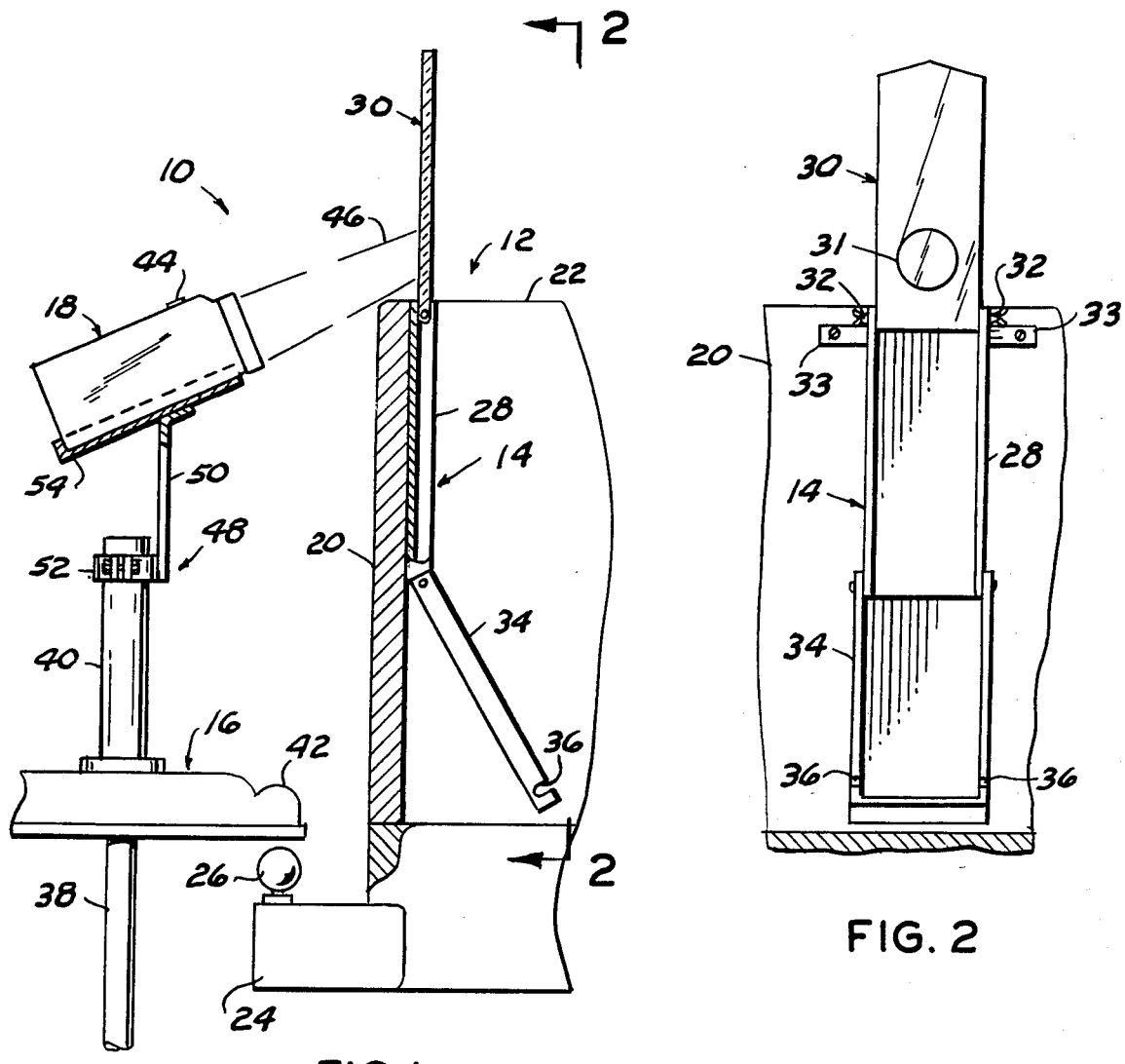
FIG. 1 is a fragmentary side elevational view, partially in section, illustrating the device in operative position; and, FIG. 2 is a fragmentary elevational view looking in the direction of the arrows 2—2 of FIG. 1.

Like characters of reference designate like parts in those figures of the drawings in which they occur.

In the drawings:

The reference numeral 10 generally indicates the hitch guide, as a whole, comprising a towing vehicle 12 having a guide target means 14 forming one component of the hitch guide mounted thereon and a trailer tongue 16 having a target illuminating lamp means 18 mounted thereon. In the example shown, the towing vehicle is a conventional pickup truck having a tailgate 20 extending transversely of the rearward end of the pickup bed 22. A conventional bumper 24 extends transversely of the pickup below and rearwardly of the tailgate 20 and centrally supports an upstanding trailer hitch ball 26. The target means 14 is mounted on the tailgate 20 medially the width of the pickup bed and intersects a vertical plane extending longitudinally of the pickup bed through the hitch ball 26.

The target means 14 comprises a folding rectangular tray-like member having a base portion 28 flatly connected vertically by lateral tabs 33 with the medial forward surface of the tailgate 20 when the latter is in closed position with the upper limit of the base member substantially parallel with the upper limit of the tailgate. A generally rectangular planar panel 30 is hingedly connected at one end as by thumb screws and bolts 32, between the upper limit of the side walls of the base member 28 for vertical pivoting movement of the panel 30 about the horizontal axis of the thumb screws from an upstanding position, as illustrated, to a folded position between the walls of the base 28. The other end edges of the panel 30 converge for the purpose presently explained. The target means 14 further includes a rectangular lid portion 34 having opposing walls and an end wall which is pivotally connected by its side walls opposite its end wall to the depending end of the base 28 for vertical pivoting movement from a closed position overlying the panel 30 to a downwardly disposed open position, as illustrated in the drawings. Slots 36, in the lid side walls, receive the bolts of the thumb screws to hold the target means in closed position when not in use. Obviously, the target means may be mounted on the rearward end portion of other towing vehicles.

The panel 30 is preferably formed from translucent material. The translucent material is preferably a selected hue, such as red, so that lamp rays, when focused thereon, appear as a circular spot of the same color but a lighter value (pink). The defined target area is shown as a printed circle 31 or may be a bull's-eye, if desired, and is disposed adjacent the depending end of the panel 30 but may be located at any position longitudinally thereof in accordance with the relative position of the hitch guiding components when in trailer hitch coupling relation, as presently explained.

The trailer tongue 16 is connected with a trailer, such as a recreational vehicle, not shown, having a trailer jack 38 enclosed by a housing 40 and vertically moved therein for supporting the trailer tongue at a selected elevation in a conventional manner. The forward end of the tongue 16 is provided with a socket portion 42 for connection with the hitch ball 26.

In the example shown, the lamp means 18 comprises a conventional battery powered lamp having a switch 44 for energizing the lamp. The lamp preferably includes a lens which focuses light rays or the light beam 46 to form an illuminated spot when the light rays impinge on the panel 30 and in particular the circular target 31. Obviously, other lamps may be used, if desired. The lamp means 18 is preferably supported on the jack housing by bracket means 48.

The bracket means 48 comprises an upstanding strap metal leg 50 secured at its depending end to the jack housing 40 by a clamp 52 in vertically adjustable relation. The upper end of the bracket leg 50 supports a platform-like lamp holder 54 having its plane angularly inclined upwardly toward the target panel 30 for directing the lamp rays 46 toward the target panel when disposed forwardly of the trailer tongue 16.

Operation

Assuming the trailer hitch socket is connected with the hitch ball 26 and the trailer has been positioned in a desired location, the trailer tongue jack 38 is lowered to support the trailer tongue 16 and lift it off of the hitch ball 26, as illustrated by FIG. 1. The jack is marked to indicate its position relative to the tongue. With the towing vehicle and trailer in this position the target means panel 30 is unfolded to its solid line position and lamp means 18 placed on the support bracket 48 and is adjusted vertically on the jack housing 40 so that with the lamp means 18 turned on the lamp rays 46 are focused on and illuminate the circular target area 31 for the purposes presently explained.

The towing vehicle 12 is then moved out of the way and the trailer tongue 16 position is adjusted by the jack to level the trailer. The lamp means is then normally removed from its support for safe keeping or other uses.

When it is desired to connect the trailer with the towing vehicle the jack is again disposed in its marked position relative to the tongue and the lamp is positioned on its support bracket 48 and its switch 44 moved to the on position. The target panel 30 is positioned to project vertically above the limit of the tailgate 20 and is held in this position by tightening the thumb screws 32. The operator backs the towing vehicle 12 toward the forward end of the trailer by visually aligning the apex of the panel 30 with the center forward surface of the trailer, not shown. When the light means lamp rays 46 contact the upper end portion of the panel 30 and as the towing vehicle moves toward the trailer the focused beam forms an illuminated spot intermediate the ends of the panel 30. The operator visually observes the position of the lamp beam spot and determines whether or not the towing vehicle is aligned with or laterally out-of-line with the trailer hitch socket 42 and corrects the position of the towing vehicle accordingly.

In the operation of the working model illustrated by the drawings, a distance of approximately $3\frac{1}{2}$ feet (1.37 meters) is traveled by the towing vehicle toward the trailer from the time the light beam first strikes the upper limit of the panel 30 until the beam is focused on the target area 31. When the beam is focused on the target area 31, the trailer hitch socket 42 is vertically positioned over the trailer hitch ball 26 so that the operator may leave the truck cab and complete the connection. Thereafter, as before, the lamp means 18 is removed and the target means 14 folded to a stored position.

Obviously the invention is susceptible to changes or alterations without defeating its practicability. Therefore, I do not wish to be confined to the preferred embodiment shown in the drawings and described herein.

I claim:

1. A trailer hitch coupling guide enabling the driver of a towing vehicle having a central longitudinal axis, to position the hitch component on the towing vehicle in cooperative coupling relation with the companion hitch component on a forwardly projecting trailer tongue, comprising:

target means including an upright translucent panel mounted on the rearward end portion of the towing vehicle;

signal means including a lamp emitting converging light rays; and, means supporting said lamp on the trailer tongue for directing the light rays in an upward and forwardly inclined direction in a vertical plane aligned with the central longitudinal axis of the trailer tongue for illuminating predetermined portions of the target means in accordance with the position and proximity of the towing vehicle relative to the companion hitch component.

2. The trailer hitch guide according to claim 1 in which the target means panel is longitudinally aligned with the central longitudinal axis of the towing vehicle, said panel having upwardly converging upper end surfaces forming a driver's guide for backing the towing vehicle toward the forward center of a trailer.

3. The trailer hitch guide according to claim 2 in which said panel is characterized by a target area intermediate its ends indicating, when illuminated by the converging light rays, a vertically superposed position of the hitch components.

4. The trailer hitch guide according to claim 2 in which said target means further includes:

a base member supporting said panel for vertical pivoting movement of the latter toward and away from a stored position in the base; and, a lid for closing the base member.

5. The trailer hitch guide according to claim 3 in which said supporting means includes:

upstanding bracket means vertically adjustably connected with the trailer tongue in alignment with the longitudinal axis of the trailer tongue, said bracket means including an upward and forwardly inclined platform underlying said lamp.

* * * * *